United States Patent [19]

Gellert

[11] 4,344,750
[45] Aug. 17, 1982

[54] EDGE GATED INJECTION MOLDING SYSTEM WITH HOLLOW SEALS

[76] Inventor: Jobst U. Gellert, 7A Prince St., Glen Williams, Ontario, Canada

[21] Appl. No.: 250,237

[22] Filed: Apr. 2, 1981

[51] Int. Cl.³ .............................. B29F 1/03; B29F 1/08
[52] U.S. Cl. .................................... 425/548; 425/549; 425/552; 425/572; 425/588
[58] Field of Search ................. 425/547, 548, 549, 552, 425/567, 568, 569, 572, 573, 588

[56] References Cited

U.S. PATENT DOCUMENTS

| | | | |
|---|---|---|---|
| 4,043,740 | 8/1977 | Gellert | 425/566 X |
| 4,222,733 | 9/1980 | Gellert | 425/566 |
| 4,286,941 | 9/1981 | Gellert | 425/566 |

FOREIGN PATENT DOCUMENTS 49-41340  11/1974  Japan ..................... 425/569

Primary Examiner—Thomas P. Pavelko
Attorney, Agent, or Firm—Riches, McKenzie & Herbert

[57] ABSTRACT

This invention relates to an edge gated injection molding system. An electrically heated sprue bushing is seated in a well in the cavity plate with a centrally extending melt runner passage which branches radially outward with separate channels leading to a number of edge gates in the cavity plate. An air gap is provided to insulate the hot sprue bushing from the surrounding cooled cavity plate and a hollow seal is provided at each gate to convey the melt across the air gap. Each seal is in alignment with one of the channels and one of the gates, and has its inner end seated in a recess in the sprue bushing and its outer end abutting against the curved wall of the cavity plate. The outer ends of the seals are dome shaped so that they are slightly resiliently deformable. A portion of the wall of the cavity plate is slightly inwardly tapered so that at the gates, the effective combined diameter of the sprue bushing and the seals is slightly larger than that of the well. Thus, when the sprue bushing is inserted into the well, the seals are slightly deformed against the wall of the cavity plate. When the sprue bushing is heated to operating temperatures, further deformation occurs, which has the advantage of providing a pressure tight seal against the curved wall of the cavity plate to prevent leakage of the melt into the air gap.

4 Claims, 2 Drawing Figures

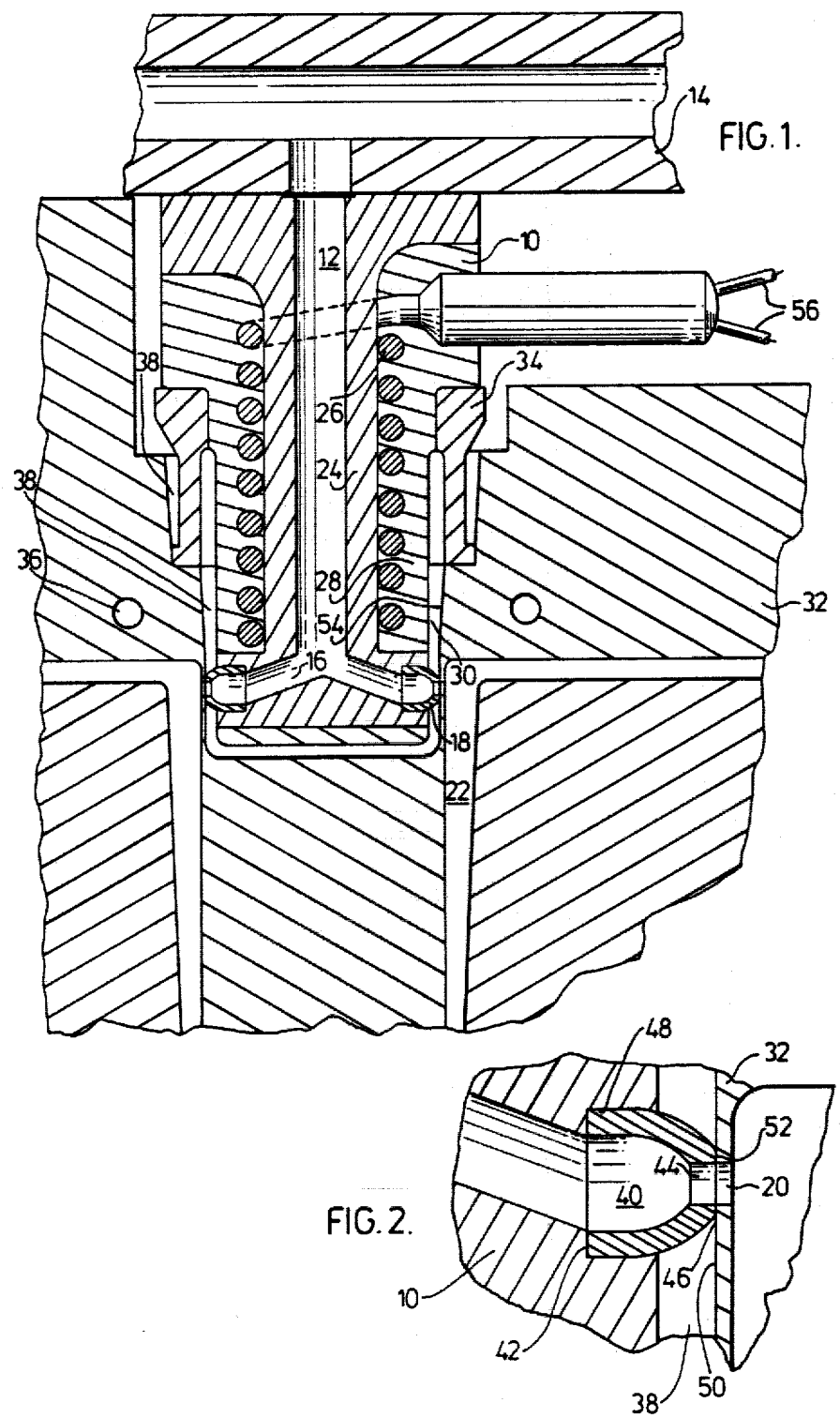

EDGE GATED INJECTION MOLDING SYSTEM WITH HOLLOW SEALS

BACKGROUND OF THE INVENTION

This invention relates to an improved system for edge gated injection molding.

In a typical edge gated system, a number of cavities are located in a cooled cavity plate around a central heated nozzle or bushing. The fact that there is no valve or other shut-off means to assist in melt flow control causes the temperature and heat flow characteristics in the gate area to be of critical importance. The system must be capable of rapidly and repeatably filling the cavities and then opening them to eject the molded product without plugging and without excessive drooling. This requires an insulation or partial insulation between the heated bushing and the cooled cavity plate so that the bushing will remain hot enough to maintain the melt in a molten state and the cavity plate will remain cool enough to quickly solidify the melt when it flows into the cavities.

In the past, this insulation has been provided by providing a space adjacent the valve gate between the bushing and the cavity plate, and allowing it to fill with melt. The melt solidifies, at least adjacent the cool cavity plate, and thus provides a degree of insulation between the bushing and the cavity plate. For instance, the applicant's U.S. Pat. Nos. 3,822,856 entitled "Hot Runner Heater" which issued July 9, 1974 and 4,094,447 entitled "Heater Cast for Multi-Cavity Hot Runner Edge Gate" which issued June 13, 1978 both show systems which carry this one step further with the radial portions of the runner passage being in direct contact with the cavity plate. However, these nozzle seals have previously been used by the applicant in valve gated injection molding systems as disclosed in U.S. Pat. No. 4,043,740 entitled "Injection Molding Nozzle Seal" which issued Aug. 23, 1977 and in U.S. patent application Ser. No. 173,084 filed July 28, 1980, now U.S. Pat. No. 4,286,941, entitled "Injection Molding Nozzle Seal". In both of these applications, the nozzle seal acts to conduct additional heat to the area of the gate which facilitates seating of the valve to improve the reliability of the system and extend the operating life of the valve pin operating mechanism. In fact, in application Ser. No. 173,084, now U.S. Pat. No. 4,286,941, the nozzle seal itself actually forms the gate itself in which the valve pin tip seats.

The fact that these advantages are only available in a valve gated system reduces the possibility that such a seal would be incorporated into other types of molding systems. More particularly, the fact that in an edge gated molding system the cavity plate wall containing the gates is curved points away from the use of these seals in an edge gated system because of the problem of leakage of the pressurized melt. If there is leakage of the melt in the gate area, it will flow into the air gap between the bushing and the cavity plate with the attendant problems mentioned above.

SUMMARY OF THE INVENTION

Accordingly, it is an object of this invention to at least partially overcome these disadvantages by providing an edge gated injection molding system which works using hollow seals between the bushing and the gates.

To this end, in one of its aspects, the invention provides a hot runner edge gated injection molding system comprising: cooled cavity plate means defining at least one openable cavity therein; a hollow electrically heated sprue bushing securely seated in a well in the cavity plate means the well having an inner wall which is spaced from the sprue bushing to form an insulative air gap therebetween, the sprue bushing having an elongated central melt passage extending from a melt inlet to at least one channel extending radially outward from the central passage to at least one corresponding edge gate in the cavity plate means, the edge gates leading to said cavity; and at least one corresponding hollow seal having a central bore extending between an inner end and an outer end which is dome shaped with a central opening therethrough, the seal extending across said air gap with its central bore being in alignment with said radially extending channel and said gate, the inner end being seated in a recess in the sprue bushing and the outer end abutting against the inner wall of the well in the cavity plate, at least a portion of the wall being slightly inwardly tapered whereby the seal is gradually slightly inwardly deformed as the sprue bushing is inserted into the well and the system heated to operating temperatures to prevent substantial leakage of the pressurized melt into the air gap.

Further objects and advantages of the invention will appear from the following description taken together with the accompanying drawings.

BRIEF DESCRIPTION OF THE DRAWINGS

FIG. 1 is a sectional view of a portion of an edge gated injection molding system according to a preferred embodiment of the invention, and FIG. 2 is an enlarged sectional view showing the relationship between one of the seals and a corresponding gate in the cavity plate.

DESCRIPTION OF THE PREFERRED EMBODIMENTS

Referring to the drawings, the edge gated injection molding system shown has at least one hollow sprue bushing 10 with a central hot runner passage 12 therethrough. The passage 12 extends from a manifold plate 14 and branches into a number of channels 16 extending radially outward from the central passage 12. Each of the channels 16 leads outwardly through a hollow seal 18 to a gate 20 leading to a cavity 22.

The sprue bushing 10 is electrically heated and may be of the general types shown in the applicant's U.S. patent application Ser. Nos. 036,880 filed May 8, 1979, now U.S. Pat. No. 4,238,671 entitled "Sprue Bushing with Cast In Heater Element" and 234,641 filed Feb. 17, 1981 entitled "Sprue Bushing and Method of Manufacture". It has a corrosion resistant inner portion 24 defining the central passage 12, a helical heating element 26 encircling the inner portion 24, and a highly conductive portion 28 cast over them. In the preferred embodiment, the inner portion 24 is formed of a beryllium nickel alloy to withstand the corrosive effects of the melt and the conductive portion is formed of a beryllium copper alloy to rapidly and evenly transfer heat from the heating element 26 to the inner portion 24. The sprue bushing 10 is seated in a well 30 in the cavity plate 32 and is securely maintained in position by insulation bushing 34. As the sprue bushing 10 is heated by heating element 26 and the cavity plate 32 is cooled by cooling element 36, the insulation bushing 34 maintains an air gap 38 between them to reduce the heat loss.

As clearly seen in FIG. 2, each of the hollow seals 18 has a central bore 40 which extends from an inner end 42 to a central opening 44 in a dome shaped outer end 46. Each hollow seal 18 extends across the air gap 38 with its inner end 42 seated in a recess 48 around one of the radial channels 16 in the sprue bushing 10 and its outer end 46 abutting against the inner wall 50 of the well 30 in the cavity plate 32. As may be seen, the dome shaped outer end 46 has a substantially flat sealing surface 52 formed by deformation against the cavity plate 32 around a gate 20 leading to one of the cavities 22. In this position, the opening 44 in the dome shaped outer end 46 of the seal 18 is in alignment with the gate 20, and the central bore 40 connects with one of the radial channels 16. The hollow seal 18 is formed of a metal to provide sufficient strength to withstand the repeated high pressure loading, but it should not be a highly conductive metal in order not to result in excessive heat transfer from the sprue bushing 10 to the cavity plate 32. In the preferred embodiment, the hollow seal 18 is formed of a titanium alloy or stainless steel.

In use, during assembly of the system a seal 18 is located in each of the recesses 48 and the sprue bushing 10 is then forced into the well 30 until it is seated on the insulation bushing 34. The sprue bushing 10 and the seals 18 are sized so that their effective combined radius is about 0.005" larger than the radius of the inner wall 50 of the well 30 at the gates 20. Thus, in order to facilitate insertion of the sprue bushing 10, a portion 54 of the wall 50 is slightly inwardly tapered leading to the gates 20. Accordingly, when the sprue bushing 10 is forced into the well 30, the dome shaped outer ends 46 of the seals 18 contact the tapered portion 54 of the wall 50 and are slightly resiliently inwardly deformed as they come to rest in position around the gates 20. During insertion, an outer face of the insulation bushing 34 is received in a cylindrical portion of the wall 50 of the cavity plate well 30 to guide the sprue bushing 10 in proper alignment. This ensures that the sprue bushing is properly aligned as deformation occurs so that a secure seal is provided. When the sprue bushing 10 is heated to operating temperatures, it expands resulting in further deformation of the dome shaped outer ends 46 of the seals 18. This shape of the seals 18 which allows for this slight inward deformation enables a pressure tight seal to be provided against the curved inner wall 50 of the well 30. While it would be possible to overcome this same problem by grinding the end of each seal 18 to the shape of the curved wall 50, this has the disadvantages that it is expensive to do and it would require that the seals 18 always be inserted at the correct orientation. If the repeated application of the high injection pressure to the heated melt does result in leakage between the seal 18 and the curved wall 50, it will escape into the air gap 38 resulting in decreased effectiveness of the insulation, as well as causing the possible problems on colour and material changes discussed above.

Following assembly, the sprue bushing 10 is heated by applying power to the heating element 26 through leads 56. A thermocouple (not shown) is usually provided to enable the temperature to be accurately controlled. The cavity plate 32 is also cooled by cooling element 36 and, after temperatures have stabilized at operating conditions, hot pressurized melt is applied from a molding machine (not shown) or other source. The melt flows from the manifold plate 14, through the central passage 12, branches out into the radially extending channels 16, through the seals 18, and into the cavities 22. After the cavities are filled, the injection pressure is withdrawn from the melt and after the melt in the cooled cavities solidifies the mold is opened to eject the molded products. The mold is then closed and this process is repeated. It is important that this process be reliably repeatable without leakage into the air gap. This is particularly so with difficult to mold engineering and flame retardant materials such as polycarbonate, polyphenylene sulfide, polyphenylene oxides and nylon 66 because these materials will deteriorate if trapped in the air gap 38. In a system such as this where the heating element 26 extends down close to the gates 20, the proximity of the application of heat to the air gap 38 would further cause deterioration of the trapped melt to an unacceptable level.

Although the disclosure describes and illustrates a preferred embodiment of the invention, it is to be understood that the invention is not limited to this particular invention. Variations and modifications will occur to those skilled in the art. For instance, while a multicavity system has been described and illustrated, it will be apparent that the invention includes a similar single cavity system. Furthermore, alternate variations of the shape of the outer ends of the seals may be provided which allow for deformation to provide the pressure seal against the curved inner wall of the cavity plate. For a definition of the invention, reference is made to the appended claims.

What I claim is:

1. A hot runner edge gated injection molding system comprising:
   (a) cooled cavity plate means defining at least one openable cavity therein;
   (b) a hollow electrically heated sprue bushing securely seated in a well in the cavity plate means, the well having an inner wall which is spaced from the sprue bushing to form an insulative air gap therebetween, the sprue bushing having an elongated central melt passage extending from a melt inlet to at least one channel extending radially outward from the central passage to at least one corresponding edge gate in the cavity plate means, the edge gates leading to said cavity; and
   (c) at least one corresponding hollow seal having a central bore extending between an inner end and an outer end which is dome shaped with a central opening therethrough, the seal extending across said air gap with its central bore being in alignment with said radially extending channel and said gate, the inner end being seated in a recess in the sprue bushing and the outer end abutting against the inner wall of the well in the cavity plate, at least a portion of the wall being slightly inwardly tapered whereby the seal is gradually slightly inwardly deformed as the sprue bushing is inserted into the well and the system heated to operating temperatures to prevent substantial leakage of the pressurized melt into the air gap.

2. A hot runner edge gated injection molding system as claimed in claim 1 wherein a plurality of channels extend radially outward from the central passage, each to a corresponding seal in alignment with a corresponding gate to a corresponding cavity.

3. A hot runner edge gated injection molding system as claimed in claim 1 wherein the inner wall of the well in the cavity plate has an alignment portion which receives alignment means carried by the sprue bushing as it is inserted into the well to ensure that the sprue bushing is properly aligned as the deformation of the seal occurs.

4. A hot runner edge gated injection molding system as claimed in claim 1, 2 or 3 wherein the seals are formed of a titanium alloy.

* * * * *